Oct. 19, 1943.  A. E. MURRAY  2,332,000
METHOD OF MANUFACTURING SHOES
Filed July 9, 1941  5 Sheets-Sheet 1

INVENTOR
Alan E. Murray
BY
Arthur Wright
ATTORNEY

INVENTOR
Alan E. Murray
BY
Arthur Wright
ATTORNEY

Oct. 19, 1943.  A. E. MURRAY  2,332,000
METHOD OF MANUFACTURING SHOES
Filed July 9, 1941  5 Sheets-Sheet 3

INVENTOR
Alan E. Murray
BY
Arthur Wright
ATTORNEY

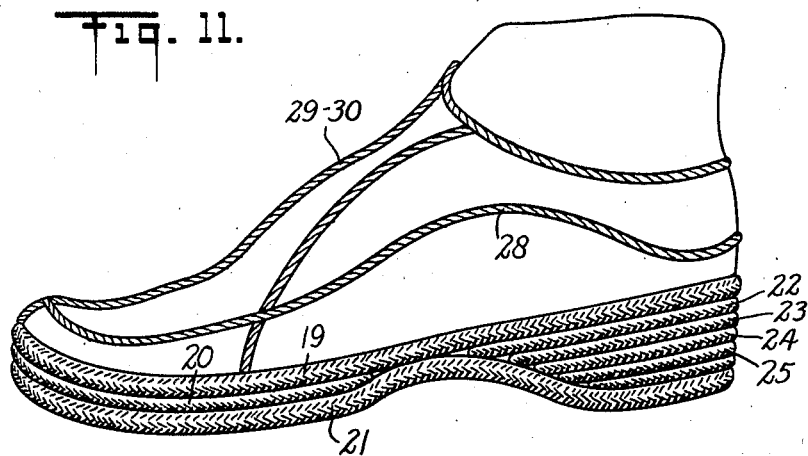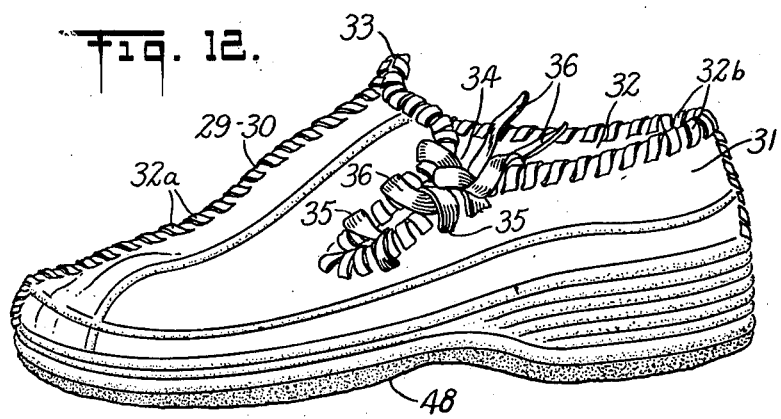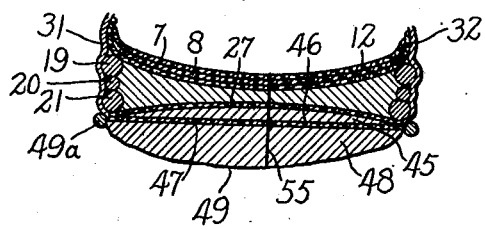

Oct. 19, 1943.  A. E. MURRAY  2,332,000
METHOD OF MANUFACTURING SHOES
Filed July 9, 1941   5 Sheets-Sheet 5

INVENTOR
Alan E. Murray
BY
Arthur Wright
ATTORNEY

Patented Oct. 19, 1943

2,332,000

UNITED STATES PATENT OFFICE 2,332,000

METHOD OF MANUFACTURING SHOES

Alan E. Murray, Wilmington, Del.

Application July 9, 1941, Serial No. 401,597

5 Claims. (Cl. 12—142)

My invention relates particularly to a process of producing molded objects, such for example as shoes, having many advantages over previous processes, as well as the product thereof.

The object of my invention is to provide a novel process, and product, of manufacturing molded objects, such for example as shoes, which may be carried out effectively by the use of sheet materials with the aid of plastics, liquids, etc. A further object is to provide a process of making shoes which provide a more effective support for the feet than is attainable from shoes made by previous methods and which, while being adapted to produce shoes having physiologically accurate conformation to the contours of the feet as set forth in my Patent No. 2,177,304, granted October 4, 1939, upon Process of obtaining effective foot impressions and product thereof, is not necessarily restricted to the making of shoes involving the foot impressions referred to in the said patent, especially when making stock shoes. A further object is to provide a process of making shoes of this character which will not only provide increased comfort for the feet and the wearing of which will serve to correct and prevent malformations of the feet, but which will provide adequate wearing quality while substantially preserving the original shape of the shoes. A further object is to make the shoes by means of a novel method of lining the same, involving reinforcement of such a character as to prevent deformation and deterioration of the shoes. Still another object is to provide means for securing internal marginal contours free from the disadvantageous angles present in footwear that are detrimental to the feet. Again, one of the objects is to provide a cofferdam around the margin of the shoe last in which a plastic filling material can be introduced for producing the curvatures necessary for eliminating the undesired angles in the shoes. One of the objects, furthermore, is to provide a method of controlling the design by applying cords to the lining and molding leather or other material over the same. Again, a further object is to provide an improved method of molding the leather so as to remain set in its three dimensional positions conforming to the contours of the feet. I have found that this may be accomplished advantageously by the softening and double impregnation of the leather with a liquid which is allowed to set while the leather is in its desired three dimensional positions. A further object is to provide an advantageous method of removing the last from the shoe after the latter has been formed thereon, by cutting along a suitable line, which may be subsequently closed by a lacing. Another object is to provide a non-cracking sole which may be plastically applied and which will give adequate wear. The object is also to provide a sole which has great elasticity due to the material from which it is formed and due to the absence of the use of pressure in the formation thereof, so as to give adequate cushioning in the use of the shoes. In fact one of the objects is to provide a sole having a cushioning effect approximating the natural cushioning of the sole of the foot but which will also not become distorted or flow out of shape in use. Another object is to provide a type of sole which will encourage shortening of the foot in use, which is especially advantageous for athletes or dancers, particularly toe dancers. This is, furthermore, advantageous in conducing to the formation and preservation of a downwardly and rearwardly slanting heel pocket in the shoe, which conforms more effectively to the natural form of the foot. Again, a further object is to provide a process of manufacture so as to produce shoes from which sewed seams and angular grooves are absent, thus avoiding unnatural unevennesses in the shoes. Further objects of my invention will appear from the detailed description of the same hereinafter.

While my invention is capable of being carried out in many different ways to produce products of many different forms, I have illustrated, by way of example in the accompanying drawings, only certain forms of my invention and certain stages in the manufacture of the same, in which—

Fig. 11 is a side view showing the cords applied to the cover preparatory to obtaining a desired design in the upper of the shoe;

Fig. 12 is a similar view of the outside of the shoe showing the layer of leather that has been applied over the cover and over said cords;

Fig. 13 is a transverse vertical section similar to Fig. 9 but showing the same after the layer of leather has been applied;

Figure 1:
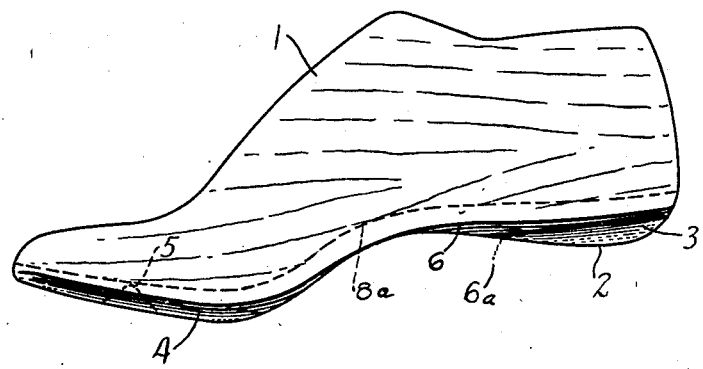
Fig. 1 is a side view of a last used in connection with my process, showing applied thereto on the bottom the first layer comprised of starch paste in the process of manufacture of stock shoes.
Figure 2:
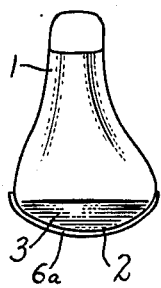
Fig. 2 is a rear elevation showing the heel of the last in Fig. 1.
Figure 3:
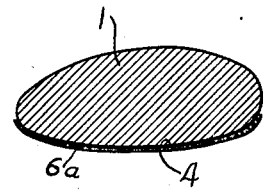
Fig. 3 is a transverse vertical section taken through the ball of the last used in accordance with the applicant's invention.
Figure 4:
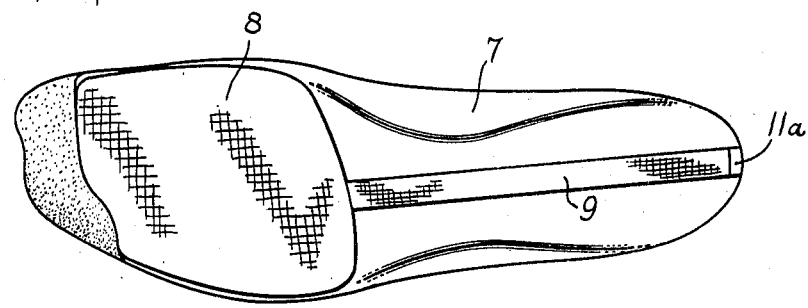
Fig. 4 is a bottom view of a physiological last showing said first layer and superposed thereon a layer of reinforcing material over the ball of the last, also a reinforcing strip over the sole in the rear of said reinforcing layer.
Figure 5:
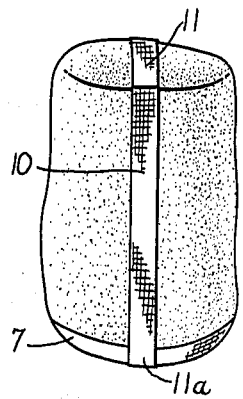
Fig. 5 is a rear view of the last of Fig. 4, showing the reinforcing heel strip.
Figure 6:
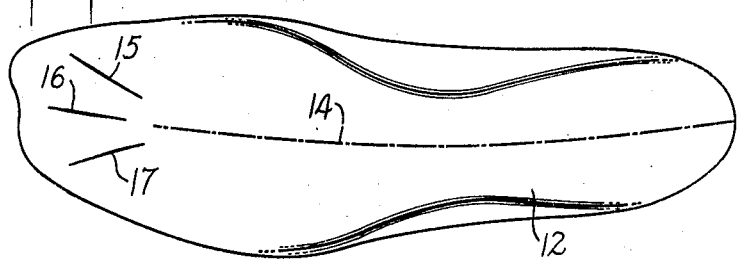
Fig. 6 is an underneath view of said last having applied thereto the above mentioned first layer, reinforcing layer, reinforcing sole strip, reinforcing heel strip and the fabric cover after having been applied over the same.
Figure 7:
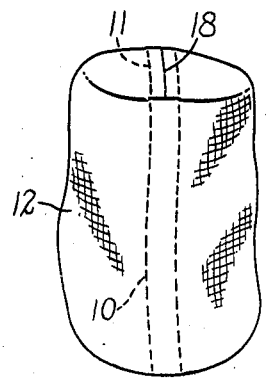
Fig. 7 is a rear view of the same after the rear edges of the cover have been fastened in place and the cover has been cut across the middle of the top of the last.
Figure 8:
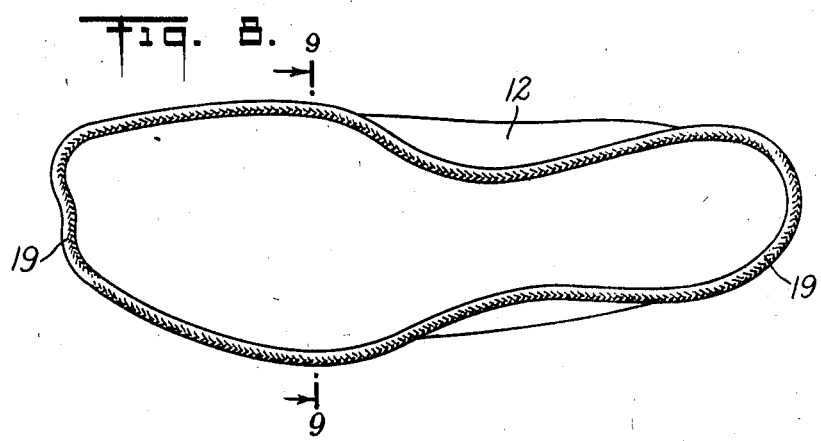
Fig. 8 is an underneath view of said last with the different materials applied thereto as in the preceding figures, and having applied over the cover the first cord along the line of the sole and heel margin.

In carrying out my process I make use of a last I which is modified from the usual form of last. The last I is, for example, a last intended for the making of stock women's shoes and it will be understood that the changes which I have made therein would be made in a similar way in the case of making men's or children's shoes. This last I is substantially like an ordinary last except that a rounded extension 2 is made below the usual heel of the last so as to form a portion 3 of the last which corresponds to what may be called a downwardly directed heel pocket, and except that the ball of the last is provided with a slightly rounded extension 4. By this means the sharp edges around the last are entirely eliminated. It will be understood, however, that the last may, if desired, be made physiologically accurate for the particular person who is to wear the shoes, in which event it will be made as described in my Patent No. 2,177,304 above referred to. When so made there would be in the bottom of the last an elongated pyramidal indentation 5 corresponding to and shaped like the pocket formed between the toes and the ball of the foot. These lasts, therefore, have rounded extensions 2 and 4 on the bottom of the last below a line 6, said line 6, being substantially the line formed at the bottom of the ordinary last in longitudinal cross-section and which represents a substantially straight line in longitudinal cross-section at the heel and ball of the last.

Over the bottom of the last so made I place a coat of thin library or starch paste 6a and then apply over the same a normally flat loosely woven fabric 7, such as monk's cloth, cotton or linen, cut to the size of the bottom of the last up to the undercut line 8a of the last from the rear end of the last up to the point or place where the toes join the ball of the last, which point is opposite the highest point of the recess 5. By the undercut line I mean the line which substantially follows around the edge of the foot at the points where the inwardly directed curvature at the bottom of the foot meets the inwardly directed curvature above the bottom of the foot. In the case where the last is made in accordance with the process in my Patent No. 2,177,304, above referred to, and which may be called a physiological plaster last, the layer of woven material 7 is pressed into close conformation to the detail of the contours of the last, particular attention being paid in conforming it to the indentation 5, and which may be designated as the pyramid. In order to avoid deterioration due to possible decomposition of the woven fabric 7, I apply a layer of reinforcing in the form of a sheet of burlap or jute fabric 8 which extends from the point where the toe end of the last joins the ball of the last back to the end of the ball of the last and up to the undercut line 8a on the two sides of the ball of the last. Also, for similar reasons I apply to the layer 7 a longitudinal rectangular strip of burlap or jute fabric 9 extending from the rear edge of the layer 8 back to the end of the heel of the last. These two pieces 8 and 9 are attached to the layer 7 by impregnating the layer 7 on which these two pieces are to be secured, as well as the surfaces of the two pieces 8 and 9 to be applied to the layer 7 with a suitable adhesive bonding material, as for example the usual water solution of prevulcanized or self vulcanizing rubber cement containing approximately the usual 60% of the rubber body and 40% of water, generally known as "latex," or other elastic bonding materials. However, throughout my process it is to be understood that "latex" is by far preferable to all other known adhesive and plastic materials for the purpose of carrying out my present invention. In a similar way, I then apply to the rear of the last I a rectangular strip of burlap or jute fabric 10, which has a portion 11 extending over the top of the last I and a portion 11a extending underneath the rear portion of the heel adjacent to the end of the rectangular strip 9. The surfaces to which the rectangular strip 10 are to be applied are preliminarily treated with the said solution of "latex" or other bonding material above referred to, and the surface of the strip 10 thus applied is also similarly treated so that the strip 10 is bonded to the top and rear of the last as well as the lower face of the layer 7. The position of this strip 10 at the rear of the last is over the position of the heel tendon of the foot.

The whole of the last is now covered from the top with another piece of normally flat fabric 12, which may be of the same material as the fabric 7 or a different soft woven material, that is cut to a sufficient size to cover the entire last plus sufficient excess to allow for pinching and pulling of the fabric. Before applying the cloth 12, however, the entire sole lining 7 as well as the burlap 8 and the strip 9, but not the heel strip 10, are impregnated with the "latex" liquid above referred to, or other bonding material, and this cover 12, the surface of which has had applied thereto the said solution of "latex" or other bonding material, is then laid on the top of the last with the central line of the cloth laid approximately on a median line 13 at the top of the last. The free edges of the cloth 12 are now drawn together along a median line 14 of the sole and by pinching with the fingers the fabric is drawn sufficiently tight so as to closely conform the front of the cloth over-all to the contours of the last. A wrinkle pattern is thus obtained which readily forms on three lines 15, 16 and 17 in the toe section of the last and one line along the median line 14. The cloth is pinched and pulled along these lines, drawing the whole front tightly on the last until it adheres, owing to the tackiness of the bonding material. The cloth 12, which is still open at the back of the heel, is then cut across the top of the last along the median line 18 over the middle of the portion 11 of the strip 10 to facilitate the edges thereof being pulled together. I now wet the heel strip 10 and the portion 11 across the top of the last with the said "latex" or other bonding material and pinch and pull the fabric together by hand to form a straight junction over the heel strip 10 and over the portion 11 of said strip. When the bonding material is set quite firmly the excess of the cloth 12 is clipped off with curved scissors above the heel strip 10 and the portion 11 thereof as well as along the median line 14 and the three wrinkles 15, 16 and 17. The last is now completely covered with the layer of fabric 12, conforming closely with the contours of the last. Accordingly, there is a triple layer of the materials at certain sections of the sole and rear of the last and a double layer up to and along the undercut line of the foot as well as a single layer over the top of the last.

Figure 9:
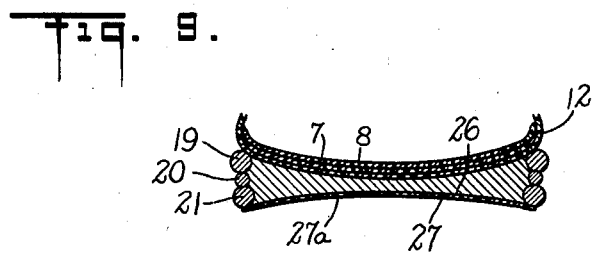
Fig. 9 is a transverse vertical section taken on line 9—9 of Fig. 8, showing additional cords attached to the cord of Fig. 8, to form a cofferdam, which is filled in with the plastic material, and overlaid with burlap into concave position to be later filled in with the plastic sole material.
Figure 10:
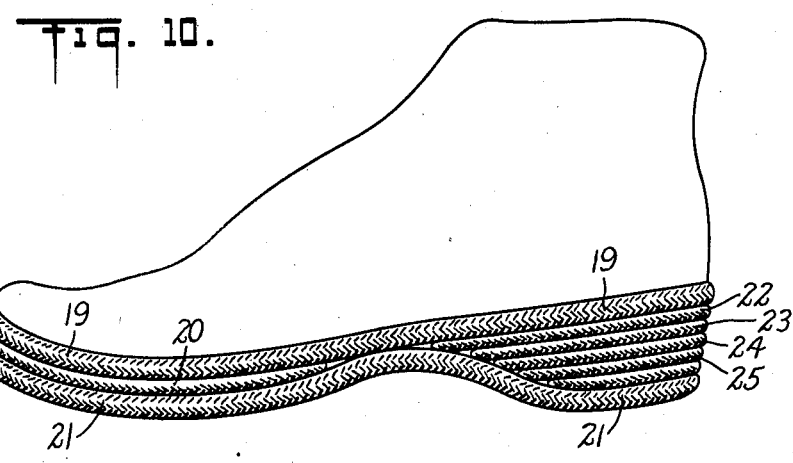
Fig. 10 is a side view showing, as an example, the arrangement of said cords at the front and rear of the shoe.

In order to form the sole margin below the undercut line a main sole cord 19, which may be of many different types, for example a braid of twisted cotton or a cord comprising a cotton filler surrounded by a woven covering, of a diameter of ¼", is placed just below the undercut line except at the instep where the cord goes far into the instep, and is placed in position to define the edge of the sole and heel margin. It will be understood that this cord 19 may be of different cross-sectional shapes, as desired, and for this purpose may be circular, square, rectangular or polygonal. The cord is temporarily held in place with pins inserted through the cord and into the cotton cover 12. When so placed, when looking down on the last, approximately half of the diameter of the cord can be seen from above around most of the last. With the aid of a metal applicator, which may be an instrument having an end like a flat pencil point, or with the aid of an artist's brush, the water solution of "latex" or bonding material above referred to is now forced into all the recesses between the cord and the cover 12. When dry the pins are removed. This cord 19 will thus form a cofferdam within the cord and into this enclosed space all around the cord a suitable plastic compound is applied, as hereinafter referred to, to form the sole. Also, one or more cords may be used, secured in succession one below the other, as above. Preliminarily, these additional cords may be held in place with pins beneath the cord 19 and if desired there may be a number of further additional cords of short lengths applied to the heel section to build up the heel to the suitable height. For example, as shown in Figs. 9 and 10, the sole portion of the last is provided with three such cords 19, 20 and 21, in which case the cords 19 and 21 extend around the instep while the cord 20 ends at said instep, and at the heel portion of the last there are four additional short cords 22, 23, 24 and 25, inserted between the cords 19 and 21. In the interstices between these several cords the "latex" or bonding material is then introduced with the applicator so as to bond the cords together, after which the pins holding the cords are removed, after drying of the "latex."

Into the cofferdam thus formed by the one or more built-up cords, that is to say, beneath the sole of the last and with the last located in inverted position, I insert a plastic material which may be comprised of the pre-vulcanized or self-vulcanizing "latex" above referred to, or other elastic bonding material, mixed with a sufficient amount of wood flour as a filler to form a thick dough-like batter, the interior of the cofferdam having been first primed by covering it with the "latex" or bonding material previously referred to herein, the batter being introduced into the cofferdam while the priming coating is still moist. In other words, this batter contains a "latex" of any desired consistency, mixed with a filling material of any desired amount, such for example as wood flour, although other filling materials may be used, and preferably a thick dough-like consistency thereof is attained, although the consistency can be widely varied, as desired. This batter is spread into the cofferdam, care being taken to force it into the corners thereof and so as to leave, as a result, a concave surface 26. Over this surface, while the plastic material is still moist, there is laid a piece of burlap 27, the surface of which has been previously primed with the "latex" or bonding material above referred to. When the latex has set, the burlap 27 is trimmed close up to the edge of the cofferdam. This then forms a sub-sole 27a for the shoe, which has a concave shape.

In order to apply further lines to the shoes for designing or decoration in connection therewith, preparatory to placing a final covering on the shoe, I may first draw with a pencil any desired lines on the outside of the shoe, along which lines I bond to the fabric, in the same way, a small cord 28, such for example as is used for making chalk lines, and which may have a diameter, for instance, slightly less than half the diameter of the cord 19. These cords are easily attached to the fabric 12 by going over the lines with the above mentioned "latex" or bonding material, then allowing the same to become tacky, and then sticking the cords 28 thereon. In order to prepare for the removal of the last, two cords 29 and 30 like the cord 28, adjacent to each other, are thus applied along the line which runs down the front portion of the last, with a view to subsequently cutting the fabric 12 between the said two cords 29 and 30.

A final covering material may then be applied to the outside of the shoe. Preferably this is in the form of a normally flat sheet of leather, as for example soft calf, kangaroo, kid, or other types of leather, although it is to be understood that a suitable woven fabric may be used for this purpose instead. The leather covering is cut into two pieces 31 nad 32, the front portions of which fit over the cords 29 and 30, respectively, while the rear portions of the pieces of leather end at the median line runing up the back of the last over the heel strip 10. The leather is preferably treated to a double impregnation in order to effectively secure a setting of the impregnating material well within the leather while in the curved form in which the leather is positioned and is to be used on the shoe, an elastic curved leather being thus obtained. In order to carry out the preliminary softening of the leather, I utilize two solutions of "latex," one of which is the "latex" or bonding material, hereinabove referred to, and the other of which is a thinner solution made by adding three parts by volume of distilled water to one part by volume of said "latex" or bonding material. The leather is laid on the table with the flesh side up and is made thoroughly wet with the thin "latex" solution, by applying the same with a brush. Next, all of the fabric and cords of the shoe are thoroughly impregnated with the other or first mentioned "latex" or bonding material, that is to say the thicker solution. Then the superficial excess of the thin "latex" solution which has been applied to the pieces of leather is wiped off while the "latex" is still soft, that is to say has not set. The pieces of leather are now applied to the fabric and cords of the shoe and the leather is rubbed into place with a cloth covered with saddle soap. By means of this rubbing in and then tooling the leather by applying a tool in the form of a round pointed applicator to force the leather around the cords, the leather is worked into all the seams and detail formed by the junction of the cords and cloth over the last. As the bonding material sets, the leather will draw in closely to the contours and the lines and detail will come through sharply. When the "latex" has set in the leather the shape and contour of the leather will remain in the set position indefinitely. The retention by the leather of this shape is insured by the method of double impregnation of the leather referred to and in a way which is not possible were the leather bonded to the other materials while still in a flat position. Any subsequent deformation of the leather applied in accordance with my process, accordingly, will tend to return of its own accord to the shape given to the leather initially on the last, and in which position the "latex" gives the leather a permanent elastic set.

Figure 15:
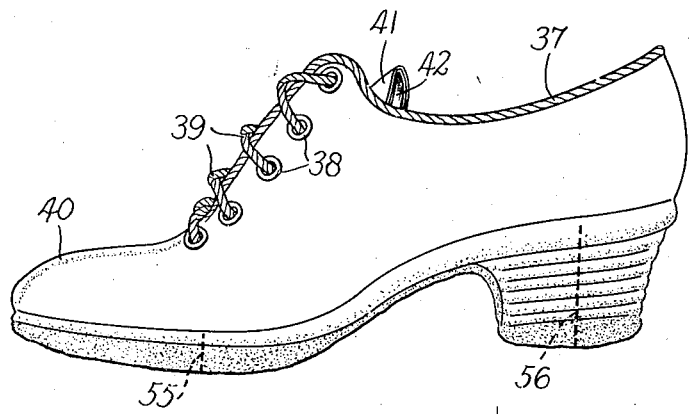
Fig. 15 is a side view of a shoe made as above but with a different type of lacing.

The fabric 12 is now cut down the front of the last as far as desired, and the strip portion 11, which goes across the top of the last, is also cut between the edges of the fabric 12, and the last 1 is then removed from the shoe. The excess leather is now trimmed off and the shoe is trimmed wherever necessary with a sharp knife, and particularly around the upper edges of the shoe. The seam formed at the top of the shoe by cutting is now laced together with a leather thong 32a and the upper edge of the shoe around the ankle is finished with a similar lacing of a leather thong 32b. This leaves, preferably, a high point 33 over the top upper portion of the foot, which is found to be a decided assistance in the wearing of the shoe, so as to hold the shoes properly in place on the feet without being required to be too tight. For putting the shoes on and removing them, the shoe can be provided with a longitudinal cut 34 and holes 35 along the edges thereof so as to receive a lacing or tie 36. However, it will be understood that the cut, or a portion thereof, made between the cords 29 and 30 may be utilized instead of the cut 34 for receiving a removable lacing at the top of the shoe in the usual way. In this event the cords 29 and 30 are preferably omitted, as shown in Fig. 15, and instead of the leather thongs 32a and 32b I provide a cord 37, fastened in place by the first mentioned "latex" or bonding material, which is applied to the shoe around the ankle and extending down the two sides of the cut at the top of the shoe, eyelets 38 being provided on both sides of said cut through which a lacing 39 passes in the usual way. In this instance, the cords 29 and 30 having been omitted, there is placed finally on the front of the shoe a very short cord 40 which is about half the diameter of the cord 19, over the adjacent top edges of the two pieces of leather 31 and 32. In this form of the shoe there would also be provided a tongue 41 of leather, bonded to a backing of fabric 42 which is longer than the leather 41 as it extends beyond the lower end thereof, and which fabric is secured to the inside of the completed shoe by inserting the tongue in the shoe and cementing the fabric end in position with the first mentioned latex bonding material.

A sole 45 of the shoe is now made by filling in the concave surface of the burlap 27, after buffing the latter free of the dried "latex" with a revolving brush, with a second batter of the first mentioned "latex," to which is added wood flour until a thick cream is attained, and to which is added sisal or other similar fibres cut in lengths ranging from 1/4 to 1/2", in an amount until a thick spongy mass results. When this plastic sets it leaves tiny air pockets in the body thereof so as to give a cushioning effect and the sisal provides an effective strengthening with the fibres thereof going in all directions. Other fillers may be used instead of wood flour and other fibres instead of sisal, but I have found these two materials to be particularly advantageous in this connection. Before applying this second batter to the concave surface of the burlap 27 the latter is primed with the said first mentioned "latex" or bonding material and the said concave surface is filled in to the level of the cofferdam, but so as to produce a flat surface 46, defined by the cords thereof, and over the top of this second batter there is laid a second piece of burlap 47 which has been well primed previously with the said first mentioned "latex" or bonding material. This is then allowed to set by drying or heat-treating and the excess of the burlap 47 is trimmed off around the edges and cleaned with a rotary brush, and a top sole 48 is applied, of the same material as said last mentioned batter, and in a similar way but so as to leave a rounded lower surface 49. This can be followed by drying or heat-treating, as above. Instead of finishing the bottom of the shoe with the convex surface 49 I may finish the shoe by applying over the plastic 48 irrespective of the shape of the lowermost contour 49, while soft, an ordinary leather sole with any suitable bonding material, if desired. It is found that the above mentioned batter, comprising "latex," wood flour and sisal, is a very advantageous composition inasmuch as when set both the absence of cracking and extraordinarily long wear can be attained, especially when the burlap layer 46 is present. If desired, additional burlap or long sisal fibres as strengthening layers may be inserted and bonded between the other layers of the shoe wherever desired. In order to provide a finish around the lowermost edge of the sole 48 I may apply a small cord 49a to the outside of the leather pieces 31 and 32, the said cord being preferably intermediate in size between the cord 49 and the cord 19 and bonded in position like the other cords.

Figure 14:
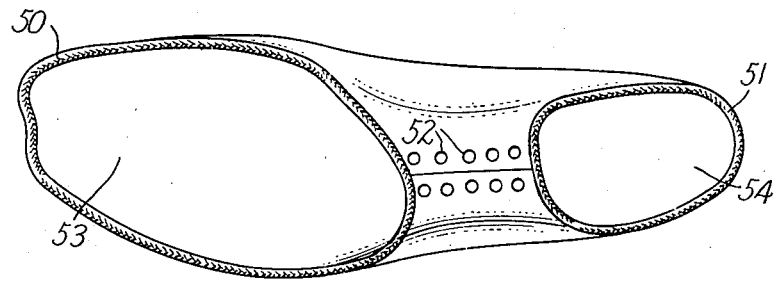
Fig. 14 is an underneath view of a modfied form of shoe made like the shoe in the previous figures except that the shoe is provided with a sole separated from the heel of the shoe in order to permit shoe shortening in use, which is advantageous for athletes, dancers, etc.

As another modification of my invention I have shown a modified form of the sole and heel arrangement in Fig. 14. The shoe shown in this figure is made in exactly the same way as the shoe in the other figures except in this instance I utilize one or more cords 50 for outlining a separate sole 53 and one or more cords 51 for outlining a separate heel 54, which are filled in in exactly the same way as shown in Fig. 11. In this instance, which is intended to induce foot-shortening in the case of athletes or dancers by encouraging the natural arched position of the foot to be restored, due to the flexibility of the arch portion of the shoe at the instep, by resulting in corresponding flexion of the arch which tones up the arch to result in its shortening, I may provide a series of ventilation holes 52 between the sole 53 and the heel 54. In fact, it will be understood that holes such as holes 52 may be applied to any other part of the top and sides of the shoes, as desired, in any of the embodiments herein.

Inasmuch as the shoe, and particularly the sole thereof, is comprised in part of a rubber material, in order to avoid over-heating, burning sensation or perspiration of the foot, etc., I insert through the entire thickness of the sole or heel and lining thereof, but preferably the sole and heel from the ground to the inner-surface of the shoe, narrow metal ribbons of flexible longitudinally-compressible thread-soft conductors of electricity 55, 56, that is to say which are as soft as textile fibre threads, and which may be in the form of aluminum foil, tinfoil, or aluminum foil or tinfoil strengthened by being twisted into a helical longitudinally compressible form with a twisted thread of cotton, linen, silk, wool, or any other textile fibres, the same being introduced through both the sole and heel with the aid of an awl or bodkin, with the free ends directed towards the foot and ground respectively. By being made longitudinally compressible all chance of irritation of the feet is avoided irrespective of the wear of the conductors or shoe soles. By combining the metal foil with the textile thread in this way the soft conductor can be inserted so as to tightly close the aperture formed to receive the conductors through the sole by means of the awl or bodkin, owing to the usual expansibility of the textile thread. It is found that with these conductors 55, 56 the over heating, burning sensation and undue moisture generally present in wearing rubber soled shoes, are entirely eliminated. This result is aided by woven fabric 7 covering the sole of the foot, said fabric having a tendency to accumulate some of the electrically conductive salty perspiration, and which, accordingly, makes effective electrical contact of the fabric with the foot due to the slight accumulation of salts therein from the normal perspiration of the foot. In other words, by my process the flexible elastic form-returning shoes are made possible by the use of the rubber and other materials, while at the same time the overheating and burning sensation thereof is eliminated by the said electrical conductors.

While I have described my invention above in detail I wish it to be understood that many changes may be made therein without departing from the spirit of the same.

I claim:

1. The process which comprises covering a last with a fabric so as to conform to the last, fastening the said fabric together over the bottom of the last, then securing a cord to the fabric around the lateral margin of the last by means of a bonding material so as to form a cofferdam, and then filling in the cofferdam with a plastic material to produce a sole.

2. The process which comprises covering a last with a fabric so as to conform to the last, fastening the edges of said fabric together over the bottom of the last, then securing a cord to the fabric around the lateral margin of the last by means of a bonding material so as to form a cofferdam, filling in the cofferdam with a plastic material to produce a sole, forming the plastic material into a concave outer surface, and securing a fabric to said surface.

3. The process which comprises covering a last with a fabric so as to conform to the last, fastening the edges of said fabric together over the bottom of the last, then securing a cord to the fabric around the lateral margin of the last by means of a bonding material so as to form a cofferdam, filling in the cofferdam with a plastic material to produce a sole, forming the plastic material into a concave outer surface, securing a fabric to said surface, and filling in the resulting outwardly concave surface with a plastic material so as to form an outwardly convex surface.

4. The process which comprises covering a last with a fabric so as to conform to the last, then securing a cord to the fabric around the lateral margin of the last by means of a bonding material so as to form a cofferdam, filling in the cofferdam with a plastic material to produce a sole, forming the plastic material into a concave outer surface, securing a fabric to said surface, filling in the resulting concave surface with a plastic material so as to form a surface, and applying a sole thereto.

5. The process which comprises covering a last with a fabric so as to conform to the last, fastening the edges of said fabric together over the bottom of the last, then securing a cord to the fabric around the lateral margin of the last by means of a bonding material so as to form a cofferdam, and then filling in the cofferdam with a plastic material to produce a sole.

ALAN E. MURRAY.